Sept. 8, 1970     K. L. MUELLER ET AL     3,527,407
BASE-THRUST NOZZLE
Filed July 23, 1968     3 Sheets-Sheet 1
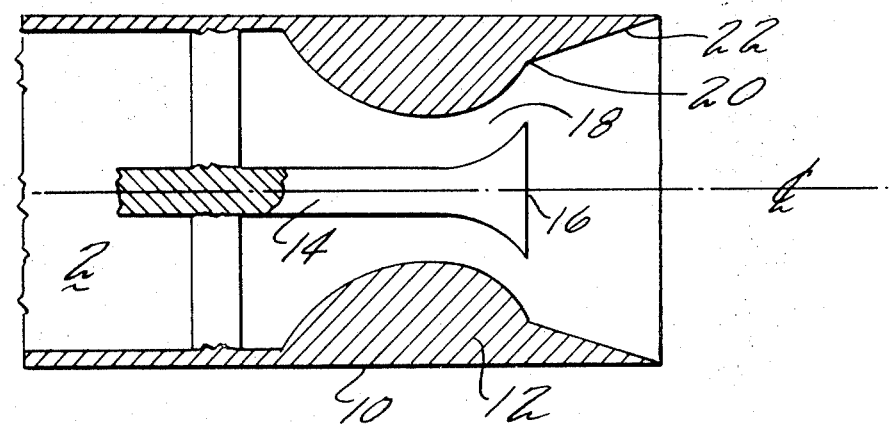
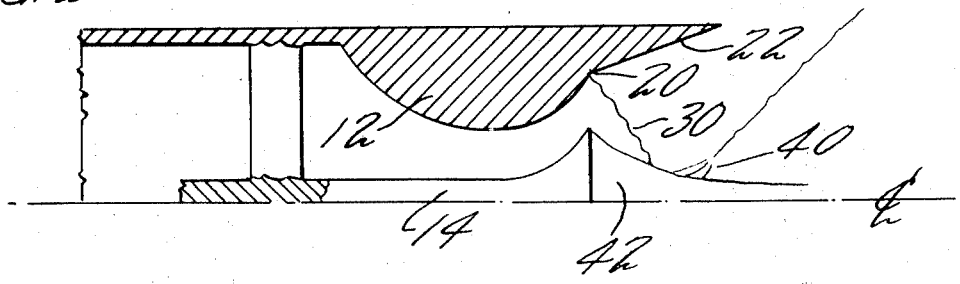
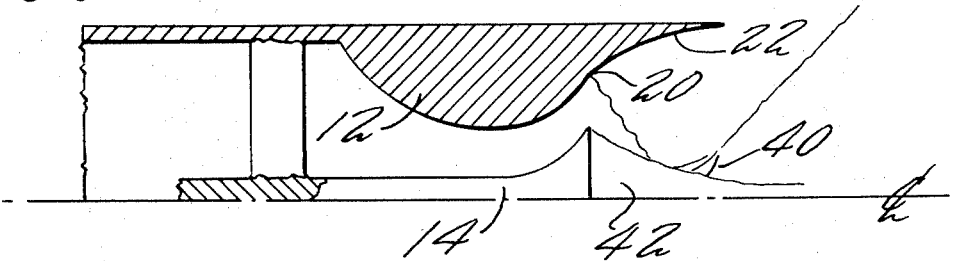
INVENTORS
KEITH MUELLER
THOMAS A. WYNOSKY 3,527,407
BASE-THRUST NOZZLE
Keith L. Mueller, East Hartford, and Thomas A. Wynosky, Hazardville, Conn., assignors to United Aircraft Corporation, East Hartford, Conn., a corporation of Delaware
Filed July 23, 1968, Ser. No. 746,996
Int. Cl. B64d *33/04*
U.S. Cl. 239—265.19                                                                 9 Claims

ABSTRACT OF THE DISCLOSURE

The present invention relates to a base-thrust nozzle for use in a jet propulsion system of supersonic vehicles. The nozzle includes a base member and plate within the nozzle having a surface on its downstream end that is capable of receiving upstream thrust pressure during operation of the propulsion system. In addition, means are provided for providing a pressure rise downstream of the base plate, causing pressurization of the base which in turn creates a thrust gain.

---

This application is reported as a subject invention under Government contract AF33(657)3128.

BACKGROUND OF THE INVENTION

This invention relates to improved nozzles for the jet propulsion systems of supersonic vehicles. More particularly, it relates to base-thrust nozzles for supersonic vehicles having improved thrust in the nozzle base region.

Base-thrust nozzles are characterized by a base member mounted inside the housing forming the engine or rocket nozzle, in such a manner that the nozzle throat is formed between the base member and the interior of the nozzle housing surface. Thus, base-thrust nozzles differ from conventional jet aircraft and rocket vehicle nozzles in which the nozzle throat is formed by the configuration of the nozzle housing itself.

It has been found that base-thrust nozzles achieve much higher expansion ratios of the fluid streams used to propel jet and rocket vehicles than can be achieved with conventional nozzles having the same nozzle length and weight. Base-thrust nozzles also offer good performance levels at lower altitudes, that is, at low nozzle operating pressure ratios. Such performance levels normally cannot be achieved at low altitudes with convention nozzles having similar expansion ratios. Although base-thrust nozzles offer various advantages, it has not been heretofore possible to achieve maximum efficiency from these nozzles because they are characterized by reduced and inefficient thrust at the base region of the nozzles. As the jet stream, which drives the aircraft and rocket vehicle, passes through a base-thrust nozzle, it is inherently separated by the base as it flows through the passageway defined between the nozzle housing and the base member itself. When the jet stream reaches the downstream end of the base member, it has been separated by the base so that the region adjacent the base and downstream from it comprises a wake region and relatively low, static pressure. This is the "separated base region" which is defined as the region downstream of the nozzle throat where there is an absence of primary jet flow due to the displacement of the jet stream by the base itself. Efficiency of the base-thrust nozzles is decreased by this low pressure in the separated base region which produces correspondently low base thrust and hence reduces the overall thrust efficiency of the vehicle.

It has been recognized that the overall efficiency of base-thrust nozzles could be improved by increasing the pressure at the separated base region, and many attempts have been made to increase this pressure, and thereby produce increased thrust at the base region. One method is to bleed a fluid stream from a secondary source directly through the base itself into the separated base region by providing apertures in the base plate, that is, the downstream face of the base member. A second method is one described in a copending application, U.S. Ser. No. 554,952, now Pat. No. 3,402,894, issued Sept. 24, 1968, entitled Improved Base Thrust Nozzles by T. Wynosky et al. This latter construction employs the use of a string extending downstream from the base member and affords a second surface for receiving upstream thrust pressure during operation of the propulsion system. While both these constructions provide operable base-thrust nozzles they may not provide the maximum efficiency afforded by these nozzles for several reasons, such as the requirement of utilizing a secondary fluid-bleed supply, or because of the increased weight necessitated by these alternative constructions. The present invention is a simple reduced weight improved efficiency base-thrust nozzle which avoids these problems.

SUMMARY OF THE INVENTION

A primary object of this invention is to provide a new and improved base-thrust nozzle which achieves increased pressure in the separated base region and hence increased efficiency of thrust generation in the base region.

Normally, the basic objective of an exhaust nozzle is to produce thrust. This is usually accomplished by accelerating the exhaust gases in as "loss free" a manner as possible. Occasionally, in order to achieve mechanical motion, such as to change a flow area or to install a thrust reverser, the nozzles must have a wall discontinuity. In supersonic nozzles this produces a shock or flow separation from the wall, resulting in losses. Hence, discontinuities of this type are generally undesirable and without exception the nozzle walls in prior art nozzles are contoured in such a manner as to minimize the discontinuity.

The uniqueness of the present invention is that a discontinuity is placed in the nozzle contour to intentionally generate a shock. This discontinuity causes local flow losses as stated previously; however, the present invention locates the discontinuity such that the shock propagates through the fluid flow stream and impinges on the separated wake behind the nozzle body. This impingement on the separated wake sets up a pressure fence causing pressurization of the base which in turn creates a thrust gain. The basic concept of the present invention is to have the base thrust gain caused by the wake impingement outweigh the thrust loss created at the discontinuity.

It has been determined that the use of a discontinuity in the nozzle contour or nozzle housing is particularly effective for large central base regions. Accordingly, the present invention is particularly adapted for base sizes having a range as follows:

$$0.5 \leq \frac{h_{base}}{h_{exit}} < 1.0$$

In other words, in a construction utilizing the present invention, the base height, or radius, should be equal to, or larger than, one-half of the nozzle exit dimension, and smaller than 1.0 times the exit dimension. Additionally, it has been determined that when a discontinuity is positioned or located in the nozzle contour, there exists a relationship between the wall deflection angle and the central base size. Accordingly, it has been found that the most optimum range of wall deflection angle is one wherein the angle has a lower limit of zero degrees and an upper limit of not greater than ninety degrees.

As has been noted hereinbefore, the basic object behind the present invention is to intentionally generate a shock that will impinge on the base wake, thus causing base pressurization which is identical to increasing the base thrust. It has been determined that if a base member with a base dimension of $H_b/H_e=0.8$ is used, then a discontinuity with a flow deflection angle of 10° is employed, that the overall thrust performance will increase by approximately seven percent.

BRIEF DESCRIPTION OF THE DRAWINGS

FIG. 1 is a simplified schematic diagram of the aft end of a propulsion system utilizing a base-thrust nozzle provided with a discontinuity in the nozzle contour in accordance with the teaching of this invention.

FIG. 2 is a sectional view taken along the centerline of the nozzle section of a base-thrust nozzle showing the device of the invention.

FIG. 5 is a sectional view taken along the centerline of the nozzle section of a base-thrust nozzle showing a second embodiment of the device of the invention.

DESCRIPTION OF THE PREFERRED EMBODIMENT

Figure 3:
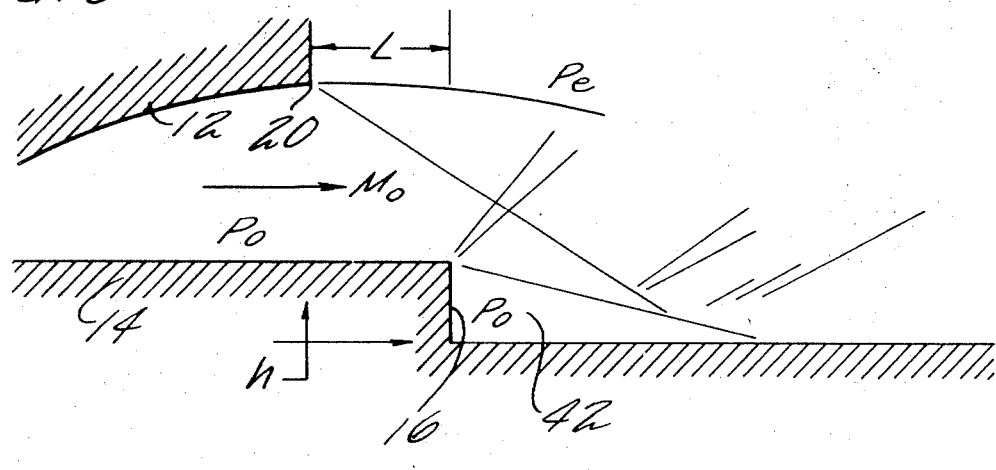
FIG. 3 is a schematic showing a shock-in-base nozzle.

Referring now to FIG. 1, the aft end of a gas turbine engine 2 is illustrated. Although the details of engine 2 are not shown, engine 2 is of a conventional design in which ambient air is drawn into a compressor and delivered in a compressed fashion to a burner section where heat is added, the air being delivered to a turbine section where the heat is extracted then discharged through a primary nozzle. It will be understood that the present invention lies in the improved structure of the nozzle and not in the particular embodiment of the overall jet engine. Thus, in accordance with the invention, any rocket or jet engine, such as turbojets, ramjects, and the like can be provided with the present improved base-thrust nozzles.

The nozzle of the turbojet engine schematically illustrated in FIG. 1 is designated generally 10. As embodied the housing 12 forming nozzle 10 has a generally straight external configuration. Thus, the external portion of the housing does not converge to form the nozzle throat but the nozzle throat of nozzle 10 is formed between the converging-diverging internal surface of the nozzle housing and the sloping surface of the nozzle housing and the sloping surface of a base member 14. Base member 14 has a base plate 16 and is mounted in the passageway 18 formed by housing 12. The base-thrust nozzle illustrated in FIG. 1 is what is commonly known as an expansion deflection nozzle (E-D nozzle). This nozzle is one of the two primary types of base-thrust nozzles presently in use, the other type being a plug-type base and is not illustrated herein. In accordance with this invention, any base-thrust type nozzle can be provided to achieve the benefits of this invention.

As embodied and shown in FIG. 1 and FIG. 2, a discontinuity 20 is positioned in the wall 22 of housing 12. As has been hereinbefore described, downstream of the base member a separated base region exists, this separated base region adversely affecting the efficiency of any base-thrust nozzle primarily as a result of a low static pressure in this region. By providing a discontinuity in the housing 12 of the nozzle, a shock wave emanating from the wall is generated. FIG. 2 illustrates that by locating the discontinuity in the wall such that the shock wave 30 propagates through the flow field and impinges on the separated wake 42 behind the base member 14 the separated wake sets up a pressure fence, causing pressurization of the base which in turn creates a thrust gain.

It has been determined that the use of discontinuity in a nozzle housing wall is particularly effective for large central base members with corresponding large base regions. Accordingly, a range of base sizes has been determined to be most desirable and is indicated by the following expression:

$$0.5 \leq \frac{h_{base}}{h_{exit}} < 1.0$$

In other words, the base height, or radius, should be equal to or larger than one-half of the nozzle exit dimension, and smaller than 1.0 times the exit dimension.

A second factor which is also critical in the location of this discontinuity is the wall deflection angle at which the shock wave is deflected from the wall. It has been found that the wall deflection angle should have an angle which is in the range of not less than zero degrees nor greater than ninety degrees; in other words, if a discontinuity employing the lower and upper limits was employed, a circumferential step would be positioned in the nozzle wall. More specifically, the first or upstream part of the discontinuity would be in a radial direction with the centerline of the engine or perpendicular thereto and the downstream portion of the step would be substantially parallel to the engine centerline.

It has been found that in some embodiments of the present invention that it is necessary that wake impingement occur upstream of the recompression region 40. That is, impingement must occur upstream of that area identified by the recompression shock system and the associated static pressure rise due to the recompression shock. In this type embodiment, the wall downstream of the discontinuity is contoured in such a manner the expansion process that normally follows a shock is minimized. This is necessary, for otherwise this expansion would negate the effect of shock-wave impingement. This contouring of the nozzle shroud is illustrated in FIG. 5.

Figure 3A:
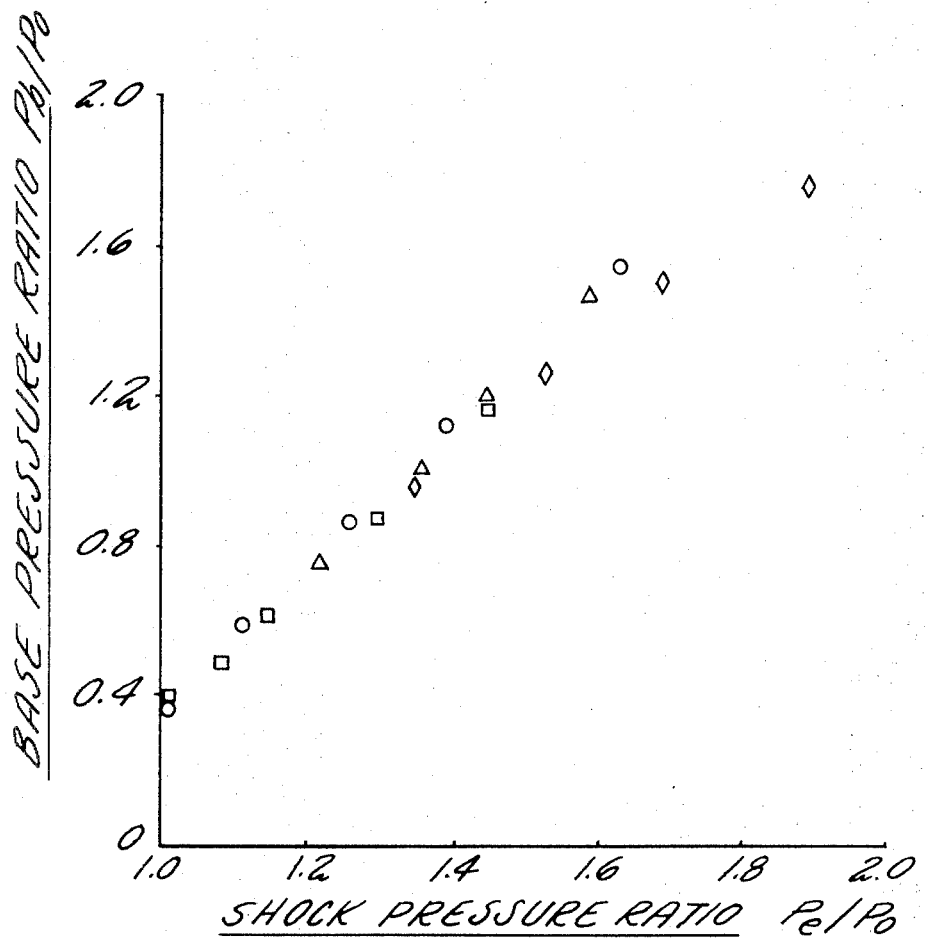
FIG. 3a represents a curve showing the degree of base pressurization that occurs as the shock strength is increased.

FIG. 3 represents a schematic showing of a shock-in-base nozzle which provided the actual test data documenting the degree of base pressurization that occurs as the shock strength is increased. This data as illustrated in FIG. 3a, was obtained with a two dimensional wind tunnel model, and indicates that base pressure increases in a linear manner with increasing impinging shock strength, $P_e/P_o$. The rate of increase in base pressure with shock strength is quite rapid. For the case presented a 50% increase in shock strength ($P_e/P_o=1.0$–$1.5$) resulted in a 300% increase in base pressure ($P_b/P_o=0.4$–$1.2$).

Figure 4:
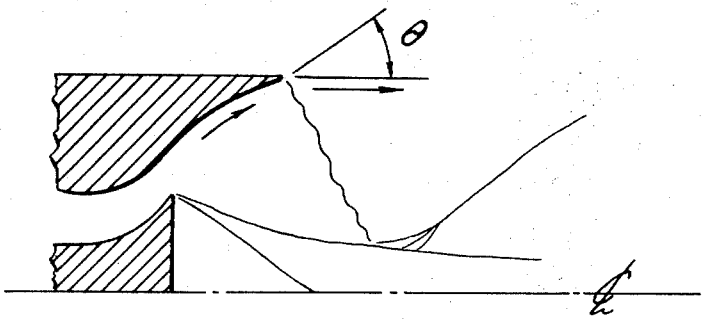
FIG. 4 is a schematic showing of the deflection angle with respect to the wall discontinuity.
Figure 4A:
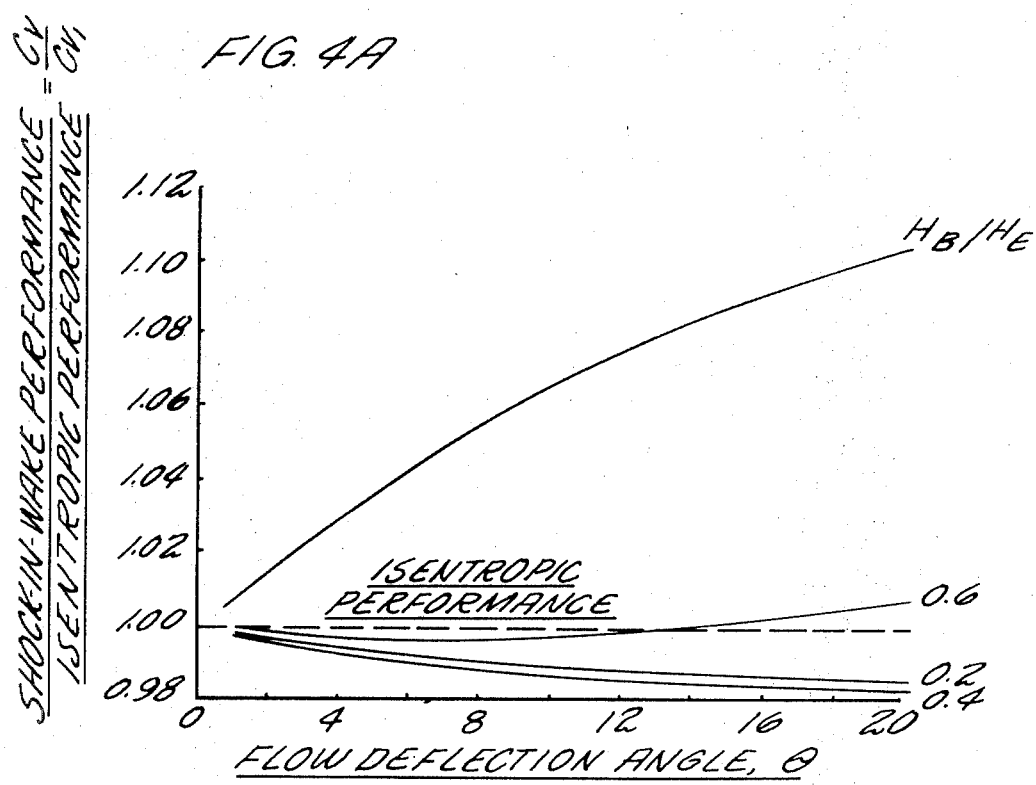
FIG. 4a represents a curve showing the improved performance for different base height and flow deflection angle conditions.

FIG. 4 represents a schematic showing of the relationship between the wall discontinuity and the deflection angle. FIG. 4a presents parametric curves which relate nozzle base size, $H_b/H_e$, and flow deflection angle, $\theta$, to shock-in-base wake nozzle design point performance, this figure illustrates that a relatively large base size must be utilized in order for the concept to improve nozzle performance.

What is claimed is:
1. The method of increasing thrust in a jet propulsion system of a supersonic vehicle comprising:
   providing an internal passageway within a nozzle housing;
   reducing the available flow area therethrough by providing a movable base member within the passageway;
   creating a region of low pressure downstream of the base;
   generating a shock wave by positioning a discontinuity within the nozzle housing; and
   causing the shock wave to propagate through the flow field and impinge on the low pressure region and thereby pressurize this region.

2. The method of increasing thrust as in claim 1 including:
   causing the shock wave to impinge upstream of the recompression region; and
   providing a discontinuity, the deflection angle of which is between the range of about zero degrees to about ninety degrees.

3. The method of increasing thrust as in claim 2 including:
   contouring the portions of the nozzle housing downstream of the discontinuity thereby minimizing the expansion of any flow thereafter.

4. A base-thrust nozzle for a jet propulsion system of a supersonic vehicle which comprises:
   a nozzle housing defining an internal passageway;
   a base member mounted in the passageway for reducing the area available for flow therethrough, the base member having a base plate at its end which is capable of receiving upstream thrust pressure during operation of the propulsion system, the flow around the base member and plate creating a region of low pressure downstream of the base member; and
   a discontinuity in the expansion zone of the nozzle housing, the discontinuity being located such that the shock wave generated impinges on the low pressure region downstream of the base member thereby pressurizing this low pressure region.

5. A base-thrust nozzle construction as in claim 4 wherein:
   the discontinuity is in the wall of the nozzle housing, the wall deflection angle being in the range of not less than zero degrees nor greater than ninety degrees.

6. A base-thrust nozzle construction as in claim 4 wherein:
   the wall downstream of the discontinuity is contoured so that further expansion of the flow is reduced to a minimum.

7. A base-thrust nozzle for a jet propulsion system of a supersonic vehicle which comprises:
   a nozzle housing defining an internal passageway:
   a base member mounted in the passageway for reducing the area available for flow therethrough, the base member having a base plate at its end which is capable of receiving upstream thrust pressure during operation of the propulsion system, the flow around the base member and plate creating a region of low pressure downstream of the base member and the size of the base member is within a range defined by the expression:

$$0.5 \leq \frac{h_{base}}{h_{exit}} < 1.0$$

where $h_{base}$ represents height of base member and $h_{exit}$ represents the nozzle exit dimension; and
   a discontinuity in the expansion zone of the nozzle housing, the discontinuity being located therein such that a shock wave is generated, this shock wave being directed from the discontinuity to the low pressure region, thereby pressurizing this region.

8. A base-thrust nozzle construction as in claim 7 wherein:
   the discontinuity is in the wall of the nozzle housing, the wall deflection angle being in the range of not less than zero degrees nor greater than ninety degrees.

9. A base-thrust nozzle construction as in claim 7 wherein:
   the wall downstream of the discontinuity is contoured so that further expansion of the flow is reduced to a minimum.

References Cited
UNITED STATES PATENTS

| | | | |
|---|---|---|---|
| 2,971,327 | 2/1961 | Moy et al. | 60—271 |
| 3,012,400 | 12/1961 | Corson | 60—271 |
| 3,402,894 | 9/1968 | Wynosky et al. | 239—265.19 X |

M. HENSON WOOD, JR., Primary Examiner

J. J. LOVE, Assistant Examiner

U.S. Cl. X.R.

239—265.11; 60—271